W. T. EASTES.
HARVESTER RAKE.

No. 106,342. Patented Aug. 16, 1870.

Witnesses:

Herm. Lauten
Fred Arbot

Inventor:

William T. Eastes
by his attorneys
A. H. & R. K. Evans

United States Patent Office.

WILLIAM T. EASTES, OF SUMMITVILLE, INDIANA.

Letters Patent No. 106,342, dated August 16, 1870.

IMPROVEMENT IN HARVESTER-RAKES.

The Schedule referred to in these Letters Patent and making part of the same

*To all whom it may concern:*

Be it known that I, WILLIAM T. EASTES, of Summitville, Madison county and State of Indiana, have invented a new and improved Harvester-Rake, of which the following is a clear, full, and exact description, reference being had to the accompanying drawing making a part of this specification, in which—

The object of my invention is to provide a self-acting rake, which will remove the grain square from the table and drop it in sheaves directly in the rear of the driving-wheels, out of the way of the machine on its next round.

To enable others skilled in the art to make and use my invention, I will proceed to describe its construction and arrangement.

A represents the frame-work of my rake, with the slats C C upon which the grain is caught as it falls.

Figure 1:
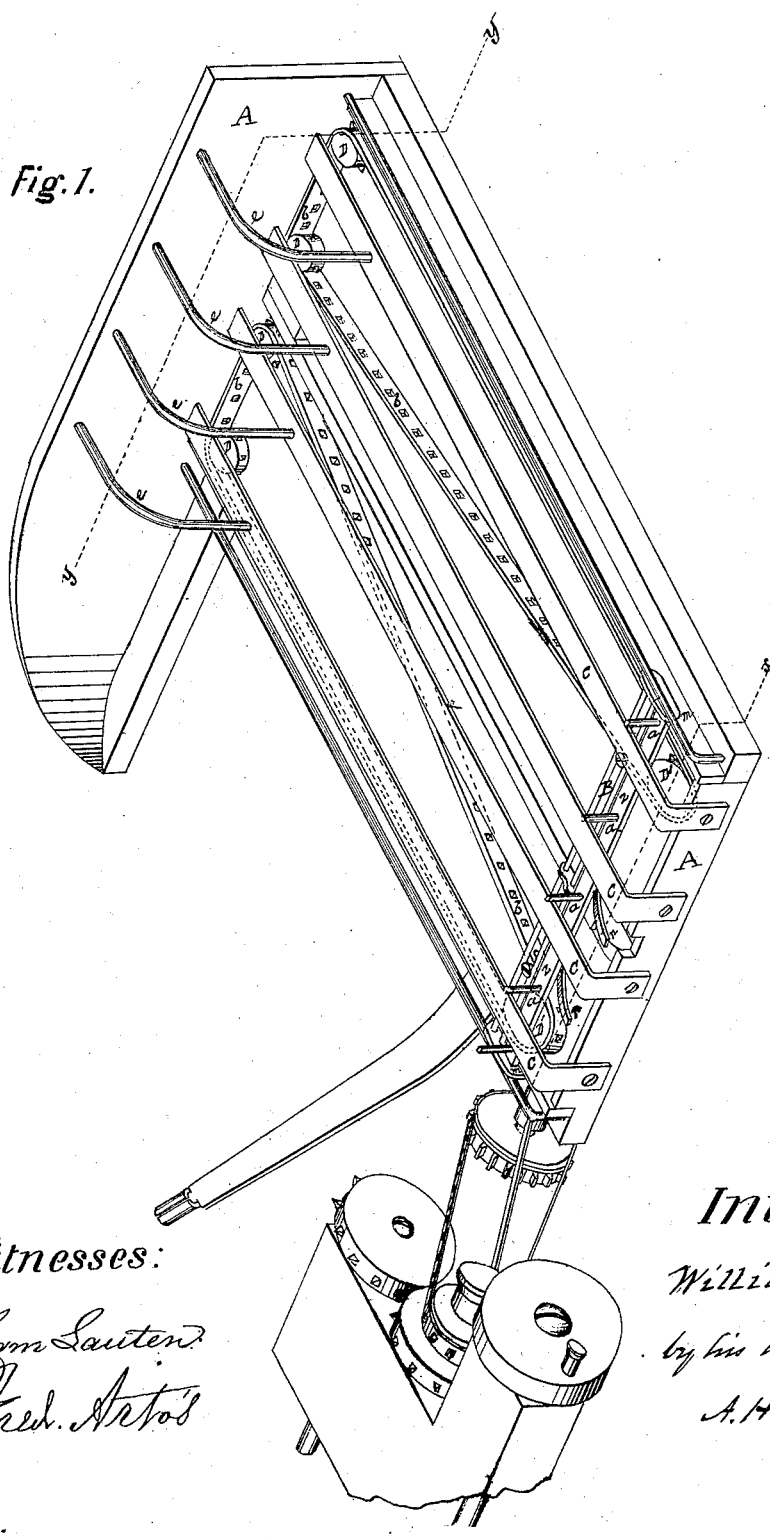
Figure 1 is a a perspective view of my invention.
Figure 2:
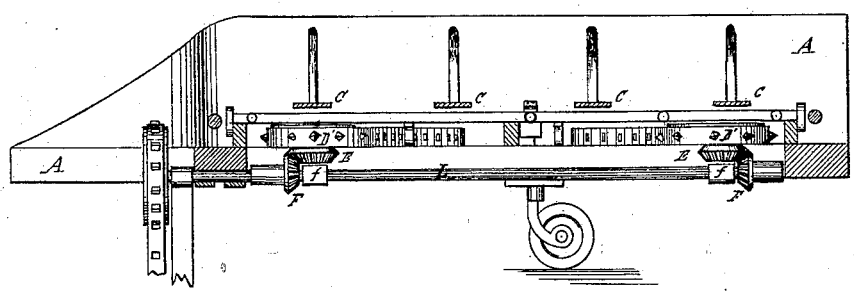
Figure 2 is a vertical sectional view through the line $x\,x$.
Figure 3:
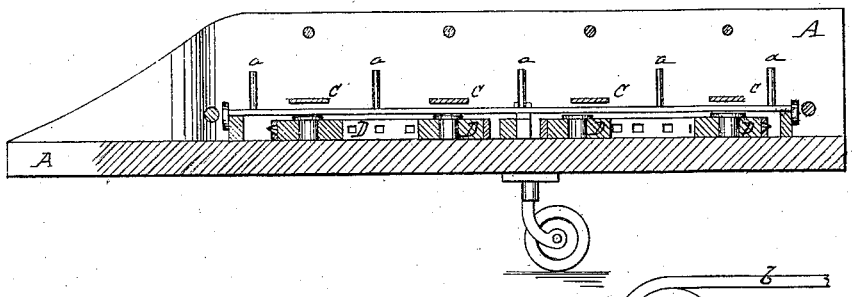
Figure 3 is a vertical sectional view through the line $y\,y$.
Figure 4:
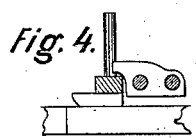
Figures 4 and 5 are details for explanation.

The bent bars $e\,e$ prevent the grain from falling behind the teeth of my rake, while the springs $n\,n$, fig. 1, prevent it falling from the table until carried off by the teeth $a\,a$.

The teeth $a\,a$ are firmly attached to the cross-bar $z\,z$, which has its bearings in the plates $m\,m$, and which has a revolving motion sufficient to allow the teeth a horizontal position on the table as the rake recedes.

Figure 5:
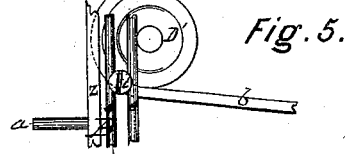

To the same plates $m\,m$ are rigidly attached the parallel bars $s\,s$, (see fig. 5,) between which slide the self-adjusting guides $i\,i$, secured to the flat chains or belts $b$, which give motion to the rake-bar $z\,z$.

The chains $b\,b$ are endless chains, working around the cog-wheels D D and D' D', the cogs in the wheels corresponding with and fitting into perforations made in the chains.

Below the wheels D D', and connected therewith, is the beveled cogged gearing E E, working into the corresponding gearing F F attached to the horizontal shaft L, which has its bearings at $f\,f$, as well as in the frame A.

The shaft L, which, through the gearing above described, gives motion to the rake, may be connected by any suitable means to the driving power of the harvester, a cog-wheel and belt being shown in my drawing.

The wheels D D and D' D' have no upper bearing, but allow the bars $z$ and $s\,s$ to pass freely over them, which enables the guides $i\,i$ to carry the rake-bar backward and forward over the table, the springs $n\,n$ yielding to the pressure of the bar, and allowing the rake to drop the sheaves.

The rake is to be thrown in or out of motion the same as the sickle.

Claim.

What I claim as my invention, and desire to secure by Letters Patent, is—

The rake-frame A, with the springs $n\,n$, wheels D D and D' D', and endless chains $b\,b$, in combination with the tooth-bar $z$, the parallel bars $s\,s$, and the guides $i\,i$, all constructed and arranged substantially as and for the purpose set forth.

WILLIAM T. EASTES.

Witnesses:
MARSHALL T. EASTES,
AUSTIN P. WORTT.